United States Patent [19]
Kirschmann

[11] 3,784,100
[45] Jan. 8, 1974

[54] FLOW CONTROL DEVICE FOR LIQUID APPLICATORS AND PROCESS OF OPERATING SAME

[76] Inventor: John D. Kirschmann, 323 Airport Rd., Bismarck, N. Dak. 58501

[22] Filed: Mar. 30, 1972

[21] Appl. No.: 239,684

[52] U.S. Cl............... 239/11, 239/127, 239/156, 239/172, 239/569
[51] Int. Cl......................... B05b 9/06, B05b 15/04
[58] Field of Search.................... 239/11, 124, 127, 239/155, 156, 172, 274, 569

[56] References Cited
UNITED STATES PATENTS

| | | | |
|---|---|---|---|
| 3,266,728 | 8/1966 | Hallberg | 239/156 X |
| 3,550,854 | 12/1970 | Fischer | 239/124 X |
| 3,326,232 | 6/1967 | Stamps et al. | 239/124 X |
| 2,662,795 | 12/1953 | Bartling | 239/127 X |
| 3,233,832 | 2/1966 | Hallberg | 239/156 X |
| 3,361,354 | 1/1968 | Johnston | 239/11 |
| 3,481,540 | 12/1969 | Maytum et al. | 239/11 X |
| 3,518,953 | 7/1970 | Johnston | 239/156 X |
| 3,612,356 | 10/1971 | McVey | 239/172 X |

*Primary Examiner*—Robert S. Ward, Jr.
*Attorney*—George F. Williamson et al.

[57] ABSTRACT

The distribution of a pressurized treating liquid, such as liquid fertilizer, from spray nozzles on an agricultural vehicle is metered and controlled to maintain a desired application rate onto the ground in gallons per minute at varying ground speeds of the vehicle by means of a control valve assembly including an applicaion selector valve located directly in the main flow line to the spray nozzles and serving to divide liquid flow between the spray nozzles and a bypass line leading to the inlet of a circulation pump. The selector valve is initially adjusted to establish a predetermined supply pressure to the spray nozzles which will provide the desired liquid application rate for a particular vehicle ground speed, crop row spacing and orifice size of the selector valve. On applications where the aforesaid circulation pump is driven by a power take-off from a vehicle engine, a second, ground speed control valve forming part of the control valve assembly and located directly in the main liquid flow line upstream of the aforesaid selector valve is adjusted to a setting corresponding to the predetermined vehicle ground speed and divides the liquid flow between the main flow passage leading to the selector control valve and a return line leading back to a liquid supply tank, or to the pump inlet.

7 Claims, 5 Drawing Figures

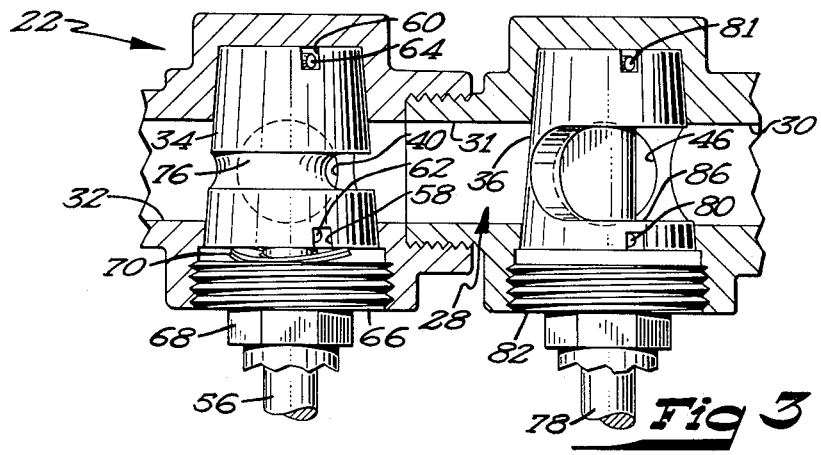
Fig 3
Fig 4
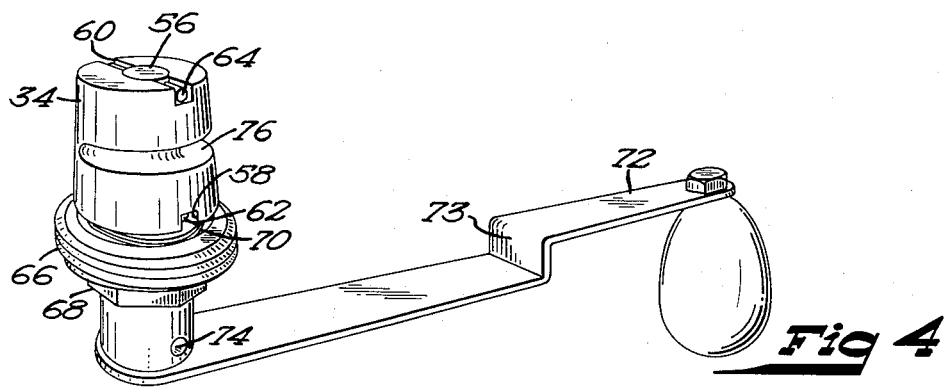
Fig 5

FLOW CONTROL DEVICE FOR LIQUID APPLICATORS AND PROCESS OF OPERATING SAME

BACKGROUND OF THE INVENTION

This invention is directed to liquid flow control apparatus and an associated method for achieving uniform application of a liquid treating agent, such as liquid fertilizer, to the ground from a tank and distribution manifold mounted on an agricultural vehicle. Ground conditioning and crop treating agents, such as liquid fertilizers, insecticides and herbicides must be delivered at different application rates in gallons per acre of ground coverage depending upon such factors as soil conditions, type of crop being raised or treated, and crop row spacing. Also, it is very important that the liquid flow rate from a supply pump to a distribution manifold be closely metered and adjusted to maintain a desired liquid application rate in gallons per acre at varying ground speeds of the farm implement or tractor on which the liquid distribution apparatus is mounted.

Various flow control arrangements have been devised and used with such liquid distribution systems, including the bypassing of a portion of liquid from a supply pump back to a supply tank in an effort to achieve a desired flow rate to a distribution manifold. However, because of deficiencies in control valve and flow circuit design, such prior flow control systems have not been successful in maintaining the close degree of metered control of liquid treating agents required for maximum efficiency of application and ground and crop treatment. This is particularly true with respect to the problem of coordinating the regulation of the flow rate of liquid to a distribution manifold for particular applications with the necessary flow adjustment which must be made for various ground speeds of the vehicle on which the liquid distribution apparatus is mounted.

The flow control apparatus and method disclosed herein have been developed with a view towards overcoming the aforesaid difficulties associated with the controlled distribution of liquid treating agents onto the ground or crops from an agricultural vehicle.

BRIEF SUMMARY OF THE INVENTION

The liquid distribution and control apparatus of this invention is mounted on an agricultural vehicle, such as a farm implement used for seeding and fertilizing, or a tractor utilized for pulling such an implement, the control apparatus being particularly characterized by a control valve assembly located between a liquid distribution manifold and a circulation pump and having valve elements so positioned and adjusted as to maintain a desired, predetermined liquid application rate for particular applications and ground speeds of the agricultural vehicle. The control valve assembly has a main flow passage connected by an inlet to the supply pump discharge and by an outlet to the distribution manifold, and has an application selector valve located directly in said main flow passage to divide flow between a supply port leading to the control valve assembly outlet and a bypass port connected to a point in the flow circuit upstream of the pump inlet. The selector valve is shiftably operable through a wide range of control positions to achieve the necessary, balanced flow between the supply port and the bypass port to achieve a particular predetermined application rate of liquid in gallons per acre.

As a particularly advantageous feature of the control valve assembly, the aforesaid application selector valve is readily removable therefrom and is comprised of a valve core detachably secured to a stem of an operating handle with the valve core having an orifice therein of predetermined size through which liquid passes to the supply port and the distribution manifold. By virtue of this particular valve construction, different valve cores having different size orifices may be interchangeably attached to the stem of the application selector valve to achieve a desired range of liquid flow rates to the distribution manifold for particular applications of liquids for agricultural purposes.

A further beneficial feature of the control valve assembly resides in the combination of a ground speed control valve with the aforesaid selector valve for use with liquid distribution and control apparatus having a circulation pump driven by a power take-off from a tractor or other drive vehicle engine. The ground speed control valve is also directly located in the aforesaid main flow passage of the control valve assembly and is shiftably operable through a number of speed control positions to divide flow between a main flow port in the aforesaid main flow passage and a return port connected to a point in the flow circuit upstream of the pump inlet. The ground speed control valve is so constructed and arranged that as it is shifted to a setting corresponding to a higher vehicle ground speed it simultaneously opens said main flow port and moves in a closing direction with respect to said return port, and vice versa as said speed control valve is shifted to a setting corresponding to a slower vehicle ground speed.

The aforesaid ground speed control valve also serves effectively as an on-off valve, this valve being shiftable to an off position wherein it completely closes the aforesaid main flow port leading to the distribution manifold and directs all flow through the return port when the pump is running but it is not desired to distribute liquid through the manifold.

These and other objects and advantages of my invention will be readily apparent as the following description is read in conjunction with the accompanying drawings wherein like reference numerals have been used to designate like elements throughout the several views.

BRIEF DESCRIPTION OF THE DRAWINGS

FIG. 3 is a section view of the control valve assembly taken along lines 3—3 of FIG. 2;

FIG. 4 is a perspective view of a selector control valve component of the control valve assembly; and FIG. 5 is a fragmentary showing of an application chart used with the liquid distribution and control apparatus of this invention.

DESCRIPTION OF THE PREFERRED EMBODIMENT

Figure 1:
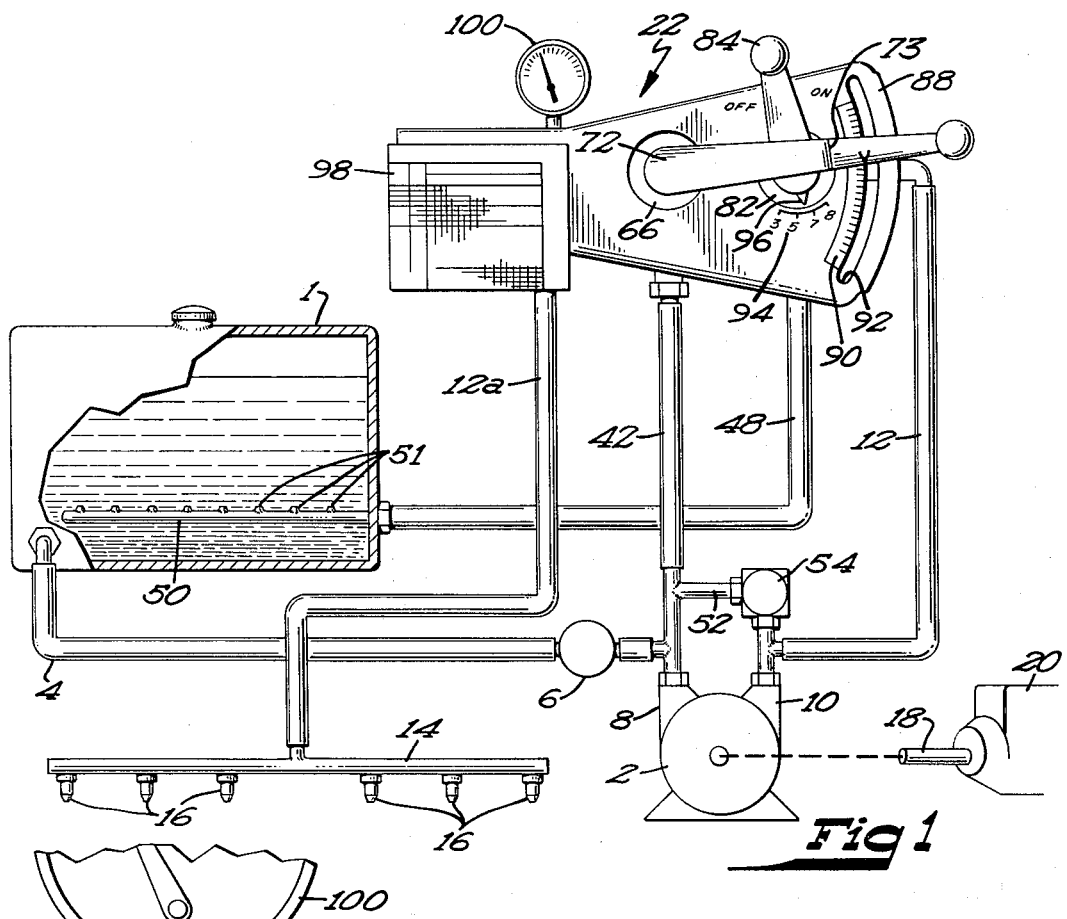
FIG. 1 is a schematic view of a liquid distribution and control apparatus of this invention.

Referring now to the drawings, I have shown in FIG. 1 a schematic layout of the liquid flow circuit and control apparatus of this invention. A tank 1 containing a supply of liquid treating agent, such as liquid fertilizer, is connected to a circulating pump 2 by means of a flow conduit 4 having a filter 6 installed therein. Pump 2 draws liquid from conduit 4 through its intake 8 and discharges pressurized fluid through a discharge fitting 10 connected to a discharge conduit 12. Discharge conduit 12 is in fluid flow communication with a supply conduit segment 12a leading to a distribution manifold 14 having a plurality of spray nozzles 16 connected thereto. Supply tank 1, pump 2 and distribution manifold 14 are all mounted on an agricultural vehicle such as a planter or drill from which a liquid treating agent, such as liquid fertilizer contained in tank 1 is distributed onto the ground as the vehicle travels along a desired spray path. These components may also be mounted directly on a tractor, the tractor mounted embodiment being illustrated in FIG. 1. In either case, distribution manifold-spray boom 14 and its spray nozzle 16 are supported and oriented in a known manner so that nozzle 16 will direct liquid spray supplied from tank 1 onto the ground in a desired pattern.

With the tractor-mounted version of the liquid distribution and control apparatus, pump 2 is driven by a power take-off directly from the tractor engine, the drive connection to pump 2 from output shaft 18 of tractor or vehicle engine 20 being illustrated schematically in FIG. 1.

Interposed between pump 2 and distribution manifold 14 in flow conduit 12-12a is a control valve assembly generally indicated by reference numeral 22. As may be noted by reference to FIG. 2 as well as to FIG. 1, control valve assembly 22 has an inlet 24 connected to pump discharge conduit 12 and an outlet 26 connected to conduit segment 12a leading to distribution manifold 14. A main flow passage through control valve assembly 22, generally indicated by reference numeral 28, and comprised of interconnecting passage segments 30, 31, and 32 serves to connect control valve assembly inlet 24 with outlet 26. With the tractor mounted and engine driven pump embodiment of FIG. 1, the control valve assembly is comprised of both an application selector valve 34 and a speed control valve 36, these valve components being positioned directly in main flow passage 28 to divide and meter liquid flowing through aligned passage segments 30, 31 and 32 thereof. As is noted below, this mounting of control valve 34 and 36 directly in the main flow line and passage leading from pump 2 to distribution manifold 24 provides a precise metering and control of the flow rate of liquid delivered through conduit segment 12a to distribution manifold 14. Application selector valve 34 is shiftably operable through a range of control positions to divide flow between a supply port 38 leading to main flow passage outlet 26 and a bypass port 40 connected by a bypass line 42 to pump inlet 8. Bypass line 42 could be connected to any point in flow conduit 4 upstream of pump inlet 8. Speed control valve 36 is also operable between a plurality of control positions to divide flow between a main flow port 44 in passage 28 and a return port 46 connected by a return line 48 to supply tank 1. An agitator 50 in the form of an elongated conduit having a plurality of upwardly directed orifices 51 may be positioned in the bottom of supply tank 1 and connected to return line 48 so that liquid discharging therethrough will pass upwardly through the contents of tank 1 and provide a mixing action. This insures that the ingredients of the liquid treating agent in tank 1 are properly mixed prior to delivery through conduit 4 to circulating pump 2 and distribution manifold 14. Alternatively, if no agitating action of the liquid contents of supply tank 1 is desired or required, return line 48 may connect directly to bypass line 42 to return liquid directly to intake 8 of pump 2. The flow circuit is completed by a small line 52 connecting pump discharge line 12 with bypass line 42, and having a pressure relief valve 54 therein. Pressure relief valve 54 is set at a predetermined pressure level so as to open and permit pressurized liquid to flow directly from pump discharge fitting 10 back to pump inlet 8 when an excessive pressure develops in discharge line 12 producing a potential overload condition on pump 2.

Figure 2:
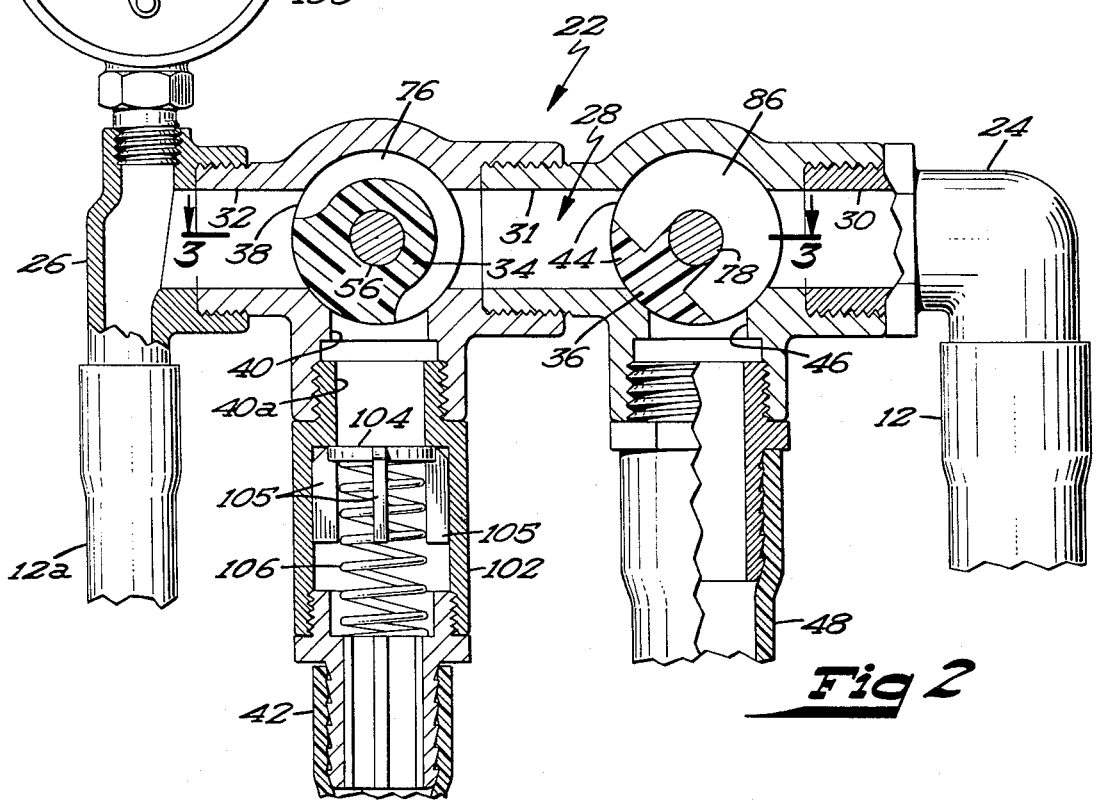
FIG. 2 is a vertical section view of the control valve assembly of this invention.

The structural and assembly features of control valve components 34 and 36 may best be understood by reference to FIGS. 2, 3 and 4. Each of these valves preferably takes the form a frusto-conical valve core, the tapered shape of which provides tight seating against flow ports 38, 40, 44 and 46. Although valve cores 34 and 36 may be formed in various ways, I have found it desirable to mold them from plastic material, such as nylon which is non-corrosive in the presence of commonly used agricultural, liquid treating agents. Core 34 of the selector control valve is slidably mounted on a valve stem 56 which extends through a longitudinal aperture in valve core 34. Transverse slots 58 and 56 extending through the top and bottom of valve core 34 are utilized to receive retention pins 62 and 64 which are inserted through valve stem 56. Bottom retention pin 64 is inserted last after core 34 is slidably placed on stem 56, and serves to hold core 34 in place on stem 56. Both pins 62 and 64 cooperate to prevent rotational displacement of valve core 34 on stem 56. A threaded plastic cap 66 is rotatably mounted on valve stem 56 above core 34, and has a nut 68 molded integrally therewith. Spring washer 70 positioned between cap 66 and the top of valve core 34 urges core 34 downwardly in tight engagement with bottom retention pin 64, thereby securing valve core 34 against vertical displacement on stem 56. An operating handle 72 is attached to the top of valve stem 56 by a set screw 74 and is utilized to rotate selector control valve 34 to a desired operating position. An offset segment 73 of operating handle 72 serves as a stop for the operating handle attached to speed control valve 36, as is hereinafter explained.

Formed circumferentially around the periphery of selector control valve core 34 is an orifice slot 76 of predetermined size to provide the desired, metered flow through supply port 38 to distribution manifold 14. Depending upon the particular application usage, type of liquid being applied, row spacing, etc., a selector control valve core 34 having an orifive 76 of specific size is selected prior to a spraying operation and detachably mounted on valve stem 56, utilizing removable retention pins 62 and 64. Valve cores 34 having orifices 76 of different sizes may be interchangeably mounted on stem 56 in order to achieve the proper, metered flow to distribution manifold 14 for a particular application.

The construction and assembly features of speed control valve 36, as illustrated in FIGS. 2 and 3, are substantially the same as those described above with respect to selector control valve 34. Frusto-conical valve core 36 is held in place on a valve stem 78 by a pair of retention pins 80 and 81, and a threaded plastic cap 82 is rotatably mounted on valve stem 78. Operating handle 84 for speed control valve 36, as shown in both FIG. 1 and FIG. 3, is tightly affixed to valve stem 78 by a set screw and is utilized to rotatably adjust valve core 36 to a number of control positions to divide flow between main flow passage 28 and return port 46 as required for a particular ground speed of a vehicle on which the liquid distribution and control apparatus is mounted. Circumferential orifice 86 extends around the periphery of valve core 36 in a manner similar to that described above with respect to orifice 76 of selector control valve 34. Orifice slot 86 is of a predetermined size, and normally there will be no need to replace valve core 36 with a core having an orifice 86 of a different size. Control valves 34 and 36 are removably mounted in valve housings 22a and 22b respectively of control valve assembly 22 by screwing plastic caps 66 and 82 into threaded apertures in the valve housings.

It is to be noted that speed control valve 36 is positioned in main flow passage 28 of control valve assembly 22 at a location upstream of application selector control valve 34. By virtue of this arrangement, speed control valve 36 achieves an initial flow separation and control based on a particular ground speed of the application vehicle. The setting of speed control valve 36 permits a predetermined flow rate of liquid through main flow port 44 based on a particular vehicle speed, and further dividing and metering of the liquid flow is achieved by selector control valve 34 to obtain a particular flow rate to distribution manifold 14 for a desired application rate in gallons per acre.

Referring now to FIG. 1, I have provided a mounting plate 88 on the control valve assembly which is provided with various indicia for determining and setting the control positions of valves 34 and 36 utilizing operating handles 72 and 84 respectively. An arcuate scale 90 having numbered increment markings thereon is utilized to determine the particular position at which selector control valve handle 72 is initially set, so that this valve can be reset to the same position for the same application, in the event that it is moved for any reason. An arcuate slot 92 having a stop device (not shown) extending therethrough is utilized to hold operating handle 72 in a desired position of use. A miles-per-hour scale 94 indicative of the ground speed of the application vehicle is provided on mounting plate 88 adjacent to a pointer indicator 96 attached to speed control valve operating handle 84 to facilitate the setting of speed control valve 36 to correspond with a particular vehicle ground speed. An application chart 98, a fragmentary portion of which is shown in FIG. 5, is also attached to mounting plate 88 and is used to make an initial pressure setting selection to permit the rotational positioning of selector control valve 34 for a particular application, in the manner described below. A pressure gauge 100 is connected to control valve assembly 22 adjacent to outlet 26 thereof in order to sence the pressure at which fluid is being supplied from control valve 34 to distribution manifold 14. The location of pressure gauge 100 in the outlet passage leading to distribution manifold 14 permits selector control valve 34 to be adjusted to obtain a particular supply pressure in conduit segment 12a leading to distribution manifold 14 in order to achieve a predetermined flow rate and application rate in gallons per acre.

Attached to control valve assembly 22 at the outlet of bypass port 40 is a fitting 102 which is utilized to house a check valve assembly. This valve assembly is comprised of a valve disc 104 which is seated against a port 40a downstream of bypass port 40 at the inlet to bypass line 42, and a valve spring 106. Formed integrally, as by plastic molding, with valve disc 104 are a plurality of downwardly depending legs 105 which serve as guides for valve disc 104 and for spring 106. Spring 106 abutts at its lower end against a shoulder of an outlet fitting 108 connected to bypass line 42.

Prior to the operation of the liquid distribution and flow control apparatus disclosed herein, reference is first made to application chart 98 to determine the supply pressure which should be indicated by pressure gauge 100 at the outlet of control valve assembly 22, for a particular liquid fertilizer, or other liquid treating agent application. Having in mind the ground condition or crop to which the liquid treating agent is to be applied, the operator first determines, based on manufacturer's recommendations, or other published specifications, the application rate in gallons per acre at which a particular liquid treating agent is to be applied. Then, a particular orifice size for orifice slot 76 of selector control valve core 34 which will deliver the desired flow rate in gallons per acre coverage, and which has a flow range in gallons per acre which will meet the immediate requirements of the operator, is selected from the application chart shown in FIG. 5. For example, referring to FIG. 5, if a liquid treating agent is to be applied at a coverage rate of 6 gallons per acre, to ground having a crop row spacing of 7 inches between rows, the operator would select a control valve core 34 having an orifice slot 76 with a size of 0.022 thousandths of an inch. As is shown on the application chart of FIG. 5, this particular orifice size has an application range of from 3.7 to 8.8 gallons per acre for a crop row spacing of 7 inches. Then, the operator simply determines the necessary supply pressure in pounds per square inch which must exist at supply conduit segment 12a for this particular orifice size and an application rate of 6 gallons per acre, utilizing application chart 98. To accomplish this, the operator must decide upon the ground speed in miles-per-hour at which the application vehicle will be traveling. For example, if the tractor or other agricultural vehicle is to be traveling at a ground speed of 5 miles-per-hour, with a row spacing of 7 inches, the operator reads down under the 5 mile-per-hour column under the 7 inch row spacing bracket until he finds the closest application rate designation in gallons per hour, which in this case will be 5.8 for a desired 6 gallons per acre application rate. Then, the operator reads across on the horizontal line at the 5.8 gallons per acre designation to the 0.022 orifice bracket where he will find a recommended pressure setting of 20 PSI. With the application vehicle traveling at the preselected speed of 5 miles-per-hour, and with power take-off driven pump 2 running, operating handle 84 of speed control valve 36 is rotated to the desired and proper position corresponding to the ground speed of 5 miles-per-hour as indicated on scale 94. Operating handle 72 of selector control valve 34 is then rotatably adjusted until the predetermined supply pressure of 20 PSI at control valve outlet 26 is indicated on pressure gauge 100. The dispensing of a liquid treating agent is then commenced, with liquid being discharged from spray nozzle 16 as the application vehicle traverses a desired application path. As is indicated in FIG. 2, control valve core 76 will divide the flow of pressurized liquid between bypass port 40 and supply port 38, with orifice 76 metering the flow at the desired rate which will achieve the predetermined application rate in gallons per acre. The location of selector control valve core 34 directly in main flow passage 28 permits orifice 76 to closely and precisely proportion flow between ports 38 and 40, thereby achieving a very accurate control of flow to distribution manifold 14. As the vehicle engine slows down or speeds up with resulting variations in ground travel speed, engine driven pump 2 will also be driven proportionately faster or slower, and preset selector control valve 34 will constantly divide and meter liquid flow to maintain a substantially constant application rate in gallons per acre. A particularly precise flow control is achieved by the combined affect of selector control valve 34 and speed control valve 36, the latter valve accomplishing a first flow proportioning and division based on the preselected ground travel speed of the application vehicle. It will be appreciated that as selector control valve 34 is rotated to different control positions for different applications or operating conditions, it will simultaneously open supply port 38 wider as it is rotated in a closing direction with respect to bypass port 40, and vice versa. Thus, selector control valve 34 not only provides a pressure control function, but also operates to accurately meter liquid flow to distribution manifold 14.

Spring-loaded check valve 104 controlling the flow out of bypass port 40 through bypass line 42 creates flow resistance which avoids encountering too great a drop in flow to the spray nozzles through supply port 38 upon a decrease in engine speed and the speed of pump 2. In this manner, check valve 104 assists in maintaining the desired flow balance between supply port 38 and bypass port 40 at various ground speeds of the application vehicle. Speed control valve 36 also functions as an on-off valve to positively shut off flow through main flow passage 28 to supply port 38 through control valve 34. This is accomplished by rotating operating handle 84 of speed control valve 36 in a clockwise direction as viewed in FIGS. 1 and 2 to a stop or off position. For this purpose, offset portion 73 of operating handle 72 functions as a stop for handle 84 when handle 84 has been rotated clockwise to a position wherein it engages handle segment 73 and has thus rotated valve core 36 to a position completely blocking main flow port 44 in flow passage 28. With speed control valve 36 rotated to this position, all of the fluid being discharged by pump 2 will be returned through port 46 and bypass line 48 to supply tank 1. Speed control valve 36 and its operating handle 84 are utilized in this manner to stop flow through spray nozzle 16 when the tractor and pump are still running, but it is desired to cease the distribution of the treating liquid, as when the tractor comes to the end of a crop row and must turn around. The use of speed control valve 36 as an on-off valve in the aforesaid manner eliminates the use of selector control valve 34 for this purpose, and thus avoids having to constantly change and reset selector control valve 34 for the proper application rate in gallons per acre.

It will be appreciated by those skilled in the art, that speed control valve 36, in combination with selector control valve 34, provides the necessary, additional degree of control required when a circulation pump is driven by a power take-off directly from a tractor or vehicle engine. Since pump 2 is driven directly from the vehicle engine 20, provision must be made to adjust the flow rate to manifold 14 by means of control valve 36 because the speed at which pump 2 is being driven by engine 20 will not necessarily reflect the ground speed at which the vehicle is traveling at various gear shift positions of the vehicle transmission.

I anticipate that various changes can be made in the construction, arrangement and assembly of the flow control apparatus disclosed herein, without departing from the spirit and scope of my invention as defined by the following claims.

I claim:

1. Liquid distribution and control apparatus mounted on an agricultural vehicle for ground application of a liquid comprising:

a supply tank containing liquid to be applied;

a liquid distribution manifold having a plurality of spray nozzles connected thereto;

a circulating pump connected in a flow circuit between said tank and said manifold and having an intake connected to said supply tank and a discharge in fluid flow communication with said distribution manifold, said pump being driven by a power take-off from an engine supplying motive power to said vehicle;

a control valve assembly interposed between the discharge of said pump and said distribution manifold, said control valve assembly having a main flow passage connected by an inlet to said pump discharge and by an outlet to said distribution manifold;

a supply port in said main flow passage leading to said main flow passage outlet;

a bypass port in said main flow passage connected to a point in said flow circuit upstream of said pump intake by a bypass line;

an application selector valve in said main flow passage and shiftably operable through a range of control positions to divide flow between said supply port and said bypass port, said selector valve being so constructed and arranged between said supply port and bypass port that it simultaneously opens said supply port wider as it is shifted in a closing direction with respect to said bypass port, and vice versa; and a main flow port in said main flow passage upstream of said selector control valve;

a return port in said main flow passage connected to a point in said flow circuit upstream of said pump inlet by a return line;

a ground speed control valve in said main flow passage upstream of said selector valve and shiftably operable through a range of control positions to divide flow between said main flow port and said return port, said speed control valve having an inlet side directly connected to said pump discharge and being so constructed and arranged between said main flow port and said return port that as it is shifted to a setting corresponding to a higher vehicle ground speed it simultaneously opens said main flow port wider and closes more of said return port, and vice versa as said speed control valve is shifted to a setting corresponding to a slower vehicle ground speed, whereby said speed control valve meters the flow of all liquid from said pump to said selector valve through said main flow port.

2. Liquid distribution and control apparatus as defined in claim 1 wherein:

said return port regulated by said ground speed control valve is connected to the bottom of said supply tank so that liquid returning to said tank through said return port will agitate the liquid contents of said tank.

3. Liquid distribution and control apparatus as defined in claim 1 wherein:
said speed control valve is shiftable to an off position wherein it completely closes said main flow port and directs all liquid flowing from said pump through said return port when the pump is running, but when it is not desired to distribute liquid through said manifold.

4. The process of distributing liquid onto the ground at a desired rate through a distribution manifold mounted on an agricultural vehicle, utilizing a circulating pump connected in a flow circuit between a liquid supply tank and said manifold by a supply line having a control valve assembly connected therein, said control valve assembly comprising an application selector valve shiftably operable through a range of control positions to divide flow between said distribution manifold and a bypass line leading back to a point in said flow circuit upstream of said pump and a ground speed control valve connected in series flow relation to said selector valve upstream thereof and shiftably operable through a number of control settings corresponding to particular ground speeds of said vehicle to divide flow between said selector valve and a point in said flow circuit upstream of said pump, comprising the steps of:
driving said agricultural vehicle along a desired liquid distribution path at a predetermined ground speed with said pump running;
shiftably adjusting said speed control valve to a setting corresponding to said ground speed; and
then shiftably adjusting said application selector valve until a predetermined pressure, as indicated by a pressure gauge, is reached at the outlet of said control valve assembly leading to said distribution manifold, said pressure being based on a desired liquid application rate in gallons per acre for a particular liquid treating agent, row spacing of crops and vehicle ground speed.

5. Liquid distribution and control apparatus mounted on an agricultural vehicle for ground application of a liquid comprising:
a supply tank containing liquid to be applied;
a liquid distribution manifold having a plurality of spray nozzles connected thereto;
a circulating pump connected in a flow circuit between said tank and said manifold and having an intake connected to said supply tank and a discharge in fluid flow communication with said distribution manifold, said pump being driven by a power take-off from an engine supplying motive power to said vehicle;
a control valve assembly interposed between said pump and said distribution manifold, said control valve assembly having a main flow passage connected by an inlet to said pump discharge and by an outlet to said distribution manifold;
an application selector valve in said main flow passage and shiftably operable through a range of control positions to divide flow between a supply port leading to said main flow passage outlet and a bypass port connected to a point in said flow circuit upstream of said pump intake by a bypass line, said selector valve being so constructed and arranged between said supply port and bypass port that it simultaneously opens said supply port wider as it is shifted in a closing direction with respect to said bypass port, and vice versa;
a ground speed control valve in said main flow passage shiftably operable through a range of control positions to divide flow between a main flow port in said main flow passage and a return port connected to a point in said flow circuit upstream of said pump inlet, said speed control valve being so constructed and arranged between said main flow port and said return port that as it is shifted to a setting corresponding to a higher vehicle ground speed it simultaneously opens said main flow port wider and closes more of said return port, and vice versa as said speed control valve is shifted to a setting corresponding to a slower vehicle ground speed; and
a ground speed indicating scale positioned adjacent to an operating handle for said ground speed control valve to facilitate the setting of said speed control valve for a particular ground speed of said agricultural vehicle.

6. Liquid distribution and control apparatus mounted on an agricultural vehicle for ground application of a liquid comprising:
a supply tank containing liquid to be applied;
a liquid distribution manifold having a plurality of spray nozzles connected thereto;
a circulating pump connected in a flow circuit between said tank and said manifold and having an intake connected to said supply tank and a discharge is fluid flow communication with said distribution manifold, said pump being driven by a power take-off from an engine supplying motive power to said vehicle;
a control valve assembly interposed between said pump and said distribution manifold, said control valve assembly having a main flow passage connected by an inlet to said pump discharge and by an outlet to said distribution manifold;
an application selector valve in said main flow passage and shiftably operable through a range of control positions to divide flow between a supply port leading to said main flow passage outlet and a bypass port connected to a point in said flow circuit upstream of said pump intake by a bypass line, said selector valve being so constructed and arranged between said supply port and bypass port that it simultaneously opens said supply port wider as it is shifted in a closing direction with respect to said bypass port, and vice versa, and said selector valve being threadedly attached to and removable from said control valve assembly and comprised of a valve core detachably secured to a stem of an operating handle, said valve core having an orifice therein of predetermined size through which liquid passes to said outlet of said main flow passage, whereby different valve cores having different size orifices may be selectively attached to said stem of said selector valve to achieve a desired range of liquid flow rates to said distribution manifold for particular applications of liquids.

7. Liquid distribution and control apparatus mounted on an agricultural vehicle for ground application of a liquid comprising:
a supply tank containing liquid to be applied;

a liquid distribution manifold having a plurality of spray nozzles connected thereto;

a circulating pump connected in a flow circuit between said tank and manifold and having an intake connected to said supply tank and a discharge in fluid flow communication with said distribution manifold, said pump being driven by a power transmission mechanism from a ground engaging wheel of said vehicle;

a control valve assembly interposed between said pump and said distribution manifold, said control valve assembly having a main flow passage connected by an inlet to said pump discharge and by an outlet to said distribution manifold;

an application selector valve in said main flow passage rotatably operable to an infinite variety of flow dividing positions between a supply port leading to said main flow passage outlet and a bypass port connected to a point in said flow circuit upstream of said pump intake by a bypass line, said selector valve being so constructed and arranged between said supply port and bypass port that it simultaneously opens said supply port wider as it is shifted in a closing direction with respect to said bypass port, and said selector valve being threadedly attached to and removable from said control valve assembly and comprised of a valve core detachably secured to a stem of an operating handle, said valve core having an orifice therein of predetermined size through which liquid passes to said outlet of said main flow passage, whereby different valve cores having different size orifices may be selectively attached to said stem of said application selector valve to achieve a desired range of liquid flow rates to said distribution manifold for particular applications of liquids.

* * * * *